(12) United States Patent
Sunada et al.

(10) Patent No.: US 9,875,246 B2
(45) Date of Patent: Jan. 23, 2018

(54) SYSTEM AND METHOD FOR GENERATING AND DISPLAYING A COCKTAIL RECIPE PRESENTATION

(71) Applicant: Liquid Presentation LLC, Las Vegas, NV (US)

(72) Inventors: Richard Sunada, Aiea, HI (US); Daylan Sunada, La Mirada, CA (US)

(73) Assignee: Liquid Presentation LLC, Las Vegas, NV (US)

( * ) Notice: Subject to any disclaimer, the term of this patent is extended or adjusted under 35 U.S.C. 154(b) by 384 days.

(21) Appl. No.: 14/791,156

(22) Filed: Jul. 2, 2015

(65) Prior Publication Data

US 2016/0098175 A1    Apr. 7, 2016

Related U.S. Application Data

(60) Provisional application No. 62/059,093, filed on Oct. 2, 2014.

(51) Int. Cl.
*G06F 3/048* (2013.01)
*G06F 17/30* (2006.01)
*G06F 17/24* (2006.01)

(52) U.S. Cl.
CPC ...... *G06F 17/30056* (2013.01); *G06F 17/245* (2013.01); *G06F 17/30424* (2013.01); *G06F 17/30554* (2013.01)

(58) Field of Classification Search
None
See application file for complete search history.

(56) References Cited

U.S. PATENT DOCUMENTS

| 2009/0319381 A1* | 12/2009 | Armstrong | G06Q 20/204 705/15 |
| 2010/0106607 A1* | 4/2010 | Riddiford | G06Q 30/0603 705/15 |

\* cited by examiner

*Primary Examiner* — Ayesha Huertas Torres
(74) *Attorney, Agent, or Firm* — Blakely Sokoloff Taylor & Zafman LLP

(57) ABSTRACT

Method of generating presentation starts by receiving user input indicating activation of presentation generator and generating and transmitting content selection display to the electronic device that includes search button, first table including list of selected cocktails, and second table including spirit type and number count. When the user input indicates selection of search button, processor generates and transmits cocktail lookup page display that includes pop-up window that includes drop-down lists or search fields including cocktail criterions and third table that includes entries matching selected cocktail criterion selected. When user input indicates activation of selection box included in the third table and subsequent user input indicates no other entries are desired, processor generates and transmits content selection display that includes updated first table that comprises the entry associated with the activated selection box. Processor then generates and transmits the presentation in a first format to the electronic device. Other embodiments are also described.

20 Claims, 17 Drawing Sheets

Create Presentation – Select Cocktails

Customer Account ID: 11111   Customer Account Name: Some Company

Cocktails  [+] [Lookup]

| Spirit Type | Brand | Supplier | Number of Ingredients | Degree of Difficulty | Cocktail Style | Cocktail Glass Style | Seasonal/Themed | Outlet Type | |
|---|---|---|---|---|---|---|---|---|---|
| Gin | Bombay™ Sapphire | Bacardi™ | 4 | 3 | Mixology | Old Fashioned | Halloween | Lobby Restaurant Pool | ⊖ |
| Gin | Bombay™ Sapphire | Bacardi™ | 4 | 3 | Mixology | Old Fashioned | Halloween | Lobby Restaurant Pool | ⊖ |
| Gin | Bombay™ Sapphire | Bacardi™ | 4 | 3 | Mixology | Old Fashioned | Halloween | Lobby Restaurant Pool | ⊖ |

Cocktail Count By Base Spirit

| ▶ Base Spirit | ▶ Count |
|---|---|
| Rum | 0 |
| Vodka | 0 |
| Whiskey | 0 |
| Gin | 3 |
| Tequila | 0 |

Table is updated

[Cancel]  [Create Presentation]

FIG. 5A

Cocktail Lookup

[Search]  [Clear Sorting]  [Clear Filter]  Select columns

[Default Columns]

| Cocktail Image | Brand | Base Spirit Category | Base Spirit/ Modifier | Juice/Liquids | Sweetener | Solids | Number of Ingredients | Degree of Difficulty | Cocktail Category | Add |
|---|---|---|---|---|---|---|---|---|---|---|
| 🍸 | | Vodka | Vodka, Fernet Branka, Bianco Vermouth | | | | 3 | 2 | Mixology | |
| 🍸 | | Bourbon | Bourbon Whiskey, Gingerbread Liqueur, Cherry-Flavored Brandy, Angostura Bitters | | | | 4 | 4 | Mixology | |
| 🍸 | | Bourbon | Bourbon Whiskey, White Crème De Cacao, Lillet Rouge | Fresh Lemon Juice | | | 4 | 3 | Mixology | |
| 🍸 | | Gin | Gin Elder/Flower Liqueur, Sparkling Wine | | Blood Orange Juice | | 4 | 4 | Mixology | |
| 🍸 | | Vodka | Vodka Blue Curacao | | Grenadine | | 3 | 3 | Classic Shooter | |
| 🍸 | | Gin | Gin Crème De Cassis, Cream Sherry | | | | 3 | 2 | Classic | |

[Close]

*FIG. 5B*

| Presentations | | | | |
|---|---|---|---|---|
| ▶ Title | ▶ Creation Date | | | |
| Pacific Ocean Bar | 04/01/2014 | Edit  Duplicate | PPTX  PDF | Delete |
| Atlantic Ocean Bar | 06/01/2014 | Edit  Duplicate | PPTX  PDF | Delete |

*FIG. 5D*

Team Review

- Some Business Unit
- California
  - Southern CA
    - ⊞ On Premise
    - ⊞ Off Premise
    - ⊞ San Diego Branch
    - ⊞ Orange County Branch
    - ⊟ Los Angeles Branch
      - Wyatt Division
      - Matt Division
      - Bob Division
      - Marc Division
      - Open Division
    - ⊞ Central Coast Branch
    - ⊞ Inland Empire Branch
  - ⊞ North CA
- ⊞ Nevada
- ⊞ Arizona Start Date: 4/06/2012
End Date: 4/05/2012

Los Angeles Branch

| ▼ Name | ▼ In Frame | ▼ In Frame LY | ▼ Current Month |
|---|---|---|---|
| John Smith1 | 34 | 100 | 6 |
| John Smith2 | 40 | 100 | 6 |
| John Smith3 | 30 | 100 | 7 |
| John Smith4 | 34 | 100 | 8 |
| John Smith5 | 34 | 100 | 6 |
| John Smith6 | 40 | 100 | 6 |
| John Smith7 | 30 | 100 | 7 |
| John Smith8 | 34 | 100 | 8 |
| John Smith9 | 34 | 100 | 6 |
| John Smith10 | 40 | 100 | 6 |
| John Smith11 | 30 | 100 | 7 |
| John Smith12 | 34 | 100 | 8 |

Pages: 1 2 3

Download

FIG. 6

Recipe Submission Page

| Field | Input | |
|---|---|---|
| Cocktail Name | [          ] | |
| Base Spirit Category | [Options ▼] | (?) |
| Supplier | [          ] | (?) |
| Degree of Difficulty | [Options ▼] | (?) |
| Cocktail Category | [Options ▼] | (?) |
| Seasonal/Themed | [Options ▼] | (?) |
| Outlet Type | [Options ▼] | (?) |

Tooltips are displayed/removed by click on question mark

Ingredients  [+ Add More] (?) Creates space for more line items

| OZ | Dash (?) | Base Spirit/Modifier (?) | Juice/Liquids (?) | Solids (?) | Sweetner (?) |
|---|---|---|---|---|---|
| 1.5 | | Calvados | (?) | | |
| 1.5 | | Dubonnet | | | |
| 1 | | | Apple Cider | | |
| 0.25 | | | Fresh Lime Juice | | |
| | | | | | |

Total Number of Ingredients: 5

| | | |
|---|---|---|
| Serving Glass Style | [Options ▼] | (?) |
| Garnish | [          ] | (?) |
| Method | Multi line textarea | (?) |
| House Made Ingredients | Multi line textarea | (?) |
| Comments | Multi line textarea | (?) |

Contributing Mixologist John Smith (john.someurl.com)  [Cancel]  [Submit]

| Name | ▼ Creation Date | ▼ Mixologist | | | |
|---|---|---|---|---|---|
| Jewel of Bombay | 04/01/2014 | John Smith | Edit | Access | Delete |
| Screwdriver | 04/02/2014 | Bill Johnson | Edit | Access | Delete |

Pages: 1 2 3

FIG. 9C

Send notifications to user

Add Group

Group [Group ▶] [Add]

Dropdown with search functionality

Notifications will be sent to groups:

| ▶ Group | ▶ Action |
|---|---|
| California State | Remove |
| Florida State | Remove |

Title:

Message: Multi line textarea

[Cancel] [Send]

*FIG. 9D*

SYSTEM AND METHOD FOR GENERATING AND DISPLAYING A COCKTAIL RECIPE PRESENTATION

CROSS-REFERENCED AND RELATED APPLICATIONS

This application claims the benefit pursuant to 35 U.S.C. 119(e) of U.S. Provisional Application No. 62/059,093, filed Oct. 2, 2014, which application is specifically incorporated herein, in its entirety, by reference.

FIELD

An embodiment of the invention relate generally to a system and a method for generating and displaying presentations. Specifically, the system includes a server that is accessible to users via computing devices. The server stores and executes a program that receives and stores data from the users, generates an interface including the data stored thereon on the users' computing devices, and generates and displaying a presentation document based on inputs from the users.

BACKGROUND

Many large companies struggle to centralize and keep up to date information on their products and their employees. When generating presentations or statistics on products and/or employees, there is a need to easily and quickly obtain information from different individuals in the company. With large companies having employees across the country, data collection becomes increasingly difficult.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIGS. 5A-5F are an exemplary graphical user interfaces that may be used in the generation of a presentation in accordance to one embodiment of the invention.

FIG. 6 is an exemplary graphical user interface that may be used in the generation of a team review document in accordance to one embodiment of the invention.

FIG. 8 is an exemplary graphical user interface that may be used in the generation of a cocktail recipe to be stored in the database for presentation generation in accordance to one embodiment of the invention.

FIGS. 9A-9D are exemplary graphical user interfaces that may be used for the administration of the system in FIG. 1 in accordance to one embodiment of the invention.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

The present invention relates to a system and method to generate a presentation document. As further described below, according to one embodiment, the system allows for a plurality of users to access a server via a network that centralizes data associated to the users as well as to cocktail recipes, spirits, performance statistics etc. In this embodiment, the server may thus generate a web application for sales representatives in the liquor industry. The web application may manage, for instance, a list of cocktails recipes, allows creation of presentation for sales representatives and help review representatives work.

Figure 1:
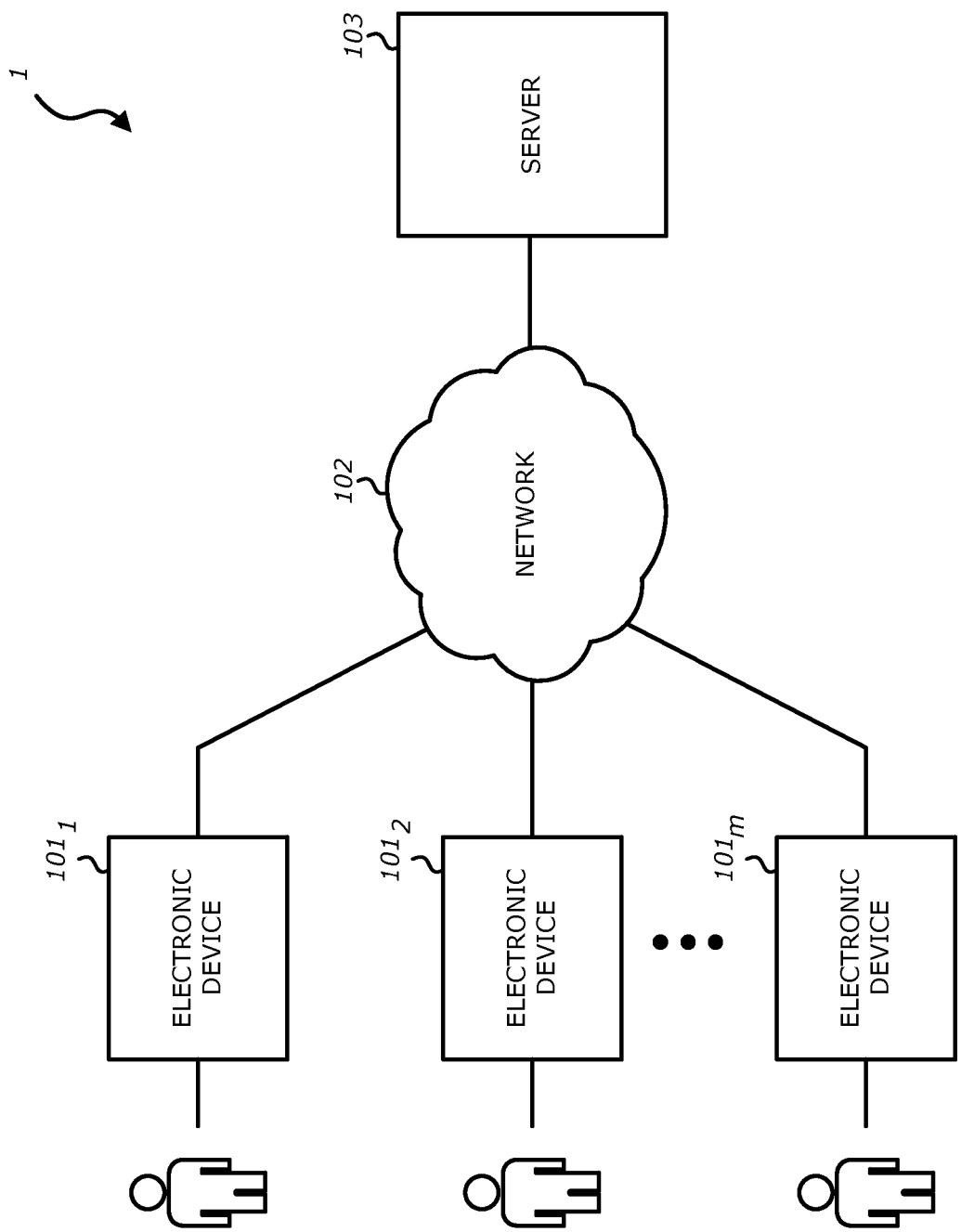
FIG. 1 illustrates a block diagram of the system to generate a presentation in accordance to one embodiment of the invention.

FIG. 1 illustrates a block diagram of the system to generate a presentation document in accordance to one embodiment of the invention. The system includes a plurality of electronic devices $101_1$-$101_N$ (N>1), a network 102, and a server 103. The electronic devices $101_1$-$101_N$ may be used by a plurality of users, respectively, to access the server 103 via the network 102.

The users may be registered or unregistered with the server 103. A registered user is a user that has created a user profile and/or provided credentials to the server 103. The users may be (i) sales representatives that may use the server 103 to create presentations, (ii) managers that may use the server 103 to review the work and performance of sales representatives, (iii) mixologists that may use the server 103 to submit cocktail recipes and may have access to specific cocktails and cocktails statistics (e.g., the cocktails that they have created), and (iv) administrators that may use the server 103 to edit the system 1 information, access rights for each user or group of users, etc. In some embodiments, the sales representatives and the managers have access to the cocktail statistics and the managers may also create presentations. Based on the access rights that are set, the server 1 restricts functionality and data available for a particular user. Accordingly, access rights for a user depends of user's roles and groups.

One user may have one or more roles which are assigned by the administrator. In one embodiment, there is one or more administrators in the system 1. The users may also be grouped in the system 1. A group may include one or more users. For instance, the sales group may be used to reflect an organizational chart for sale forces: business unit, states, regions, branches and divisions. A user in a sales group may have a sales representative or manager roles. In one embodiment, the sales group may be a child group to only one parent group (i.e., there are only one-to-many relationship between parent group and child group) and it may be prohibited to create a cycle in a sales group (i.e., a parent group cannot be a child group to one of its child groups). The access rights may be inheriting which means that if user was granted access to group then he has access to all members of this group (and members of members). Another group may be a mixologist group which is used to reflect distributor organizations. The mixologist group may include users with a mixologist role. Nested groups may not be supported in the mixology group. Also mixologist group can have an association with sales group. The association used to automatically publish cocktails to a specific sales division. In this embodiment, the user or users that are administrators may edit the group memberships. For instance, the administrator may add or remove users from groups.

Access rights based on roles of a user may be set by the server 103. In one embodiment, the unregistered user may only have access to public area of pages being transmitted by the server 103 while the registered user has access to a user area of pages being transmitted by the server 103. A user that has a sales representative role may have access for presentation creation and export of the presentation. In some embodiments, the user that has a sales representative role may only use cocktails in presentation that are available for his group. The user that has a sales representative role may also obtain cocktails statistic for all cocktails available for presentation creation. A user that has a manager role may obtain reports of all sales representatives, cocktails statistic and may create presentations. The user that has a manager role may only access data for sales representatives and cocktails in his group and subgroups. The user that has a mixologist role may have the access right to add and edit cocktail recipes. In some embodiments, the user that has a mixologist role may also view and edit recipes created by other users from the same group. In one embodiment, the user that has a mixologist role may also have rights to create presentations and obtain cocktail statistics using only cocktails from his group. The user that has an administrator role may have access to administrative area of the system 1 and has access rights to manage work of all groups.

Figure 2:
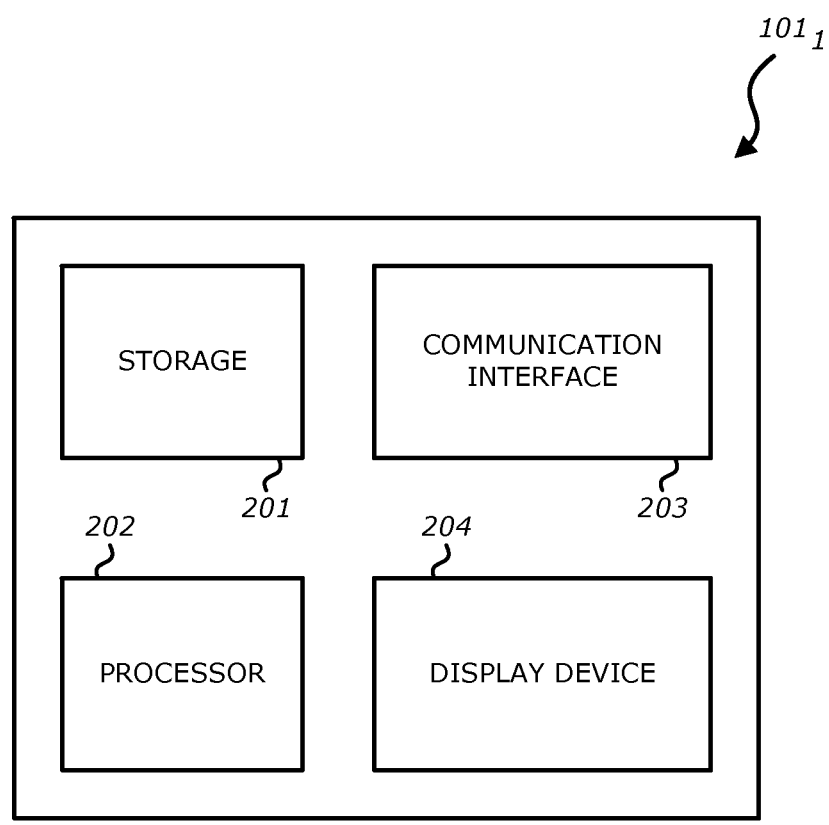
FIG. 2 illustrates a block diagram of the details of an electronic device included in the system in FIG. 1 in accordance to one embodiment of the invention.

Referring back to FIG. 1, electronic devices $101_1$-$101_N$ may be a mobile telephone communications device (or mobile device) or a smartphone, a desktop computer, a tablet computer, a personal digital media player, a notebook computer, and laptop computer. FIG. 2 illustrates a block diagram of the details of an electronic device $101_1$ included in the system in FIG. 1 in accordance to one embodiment of the invention and which may allow the device $101_1$ to function in accordance with the techniques discussed herein. The various functional blocks shown in FIG. 2 may include hardware elements (including circuitry), software elements (including computer code stored on a computer-readable medium, such as a hard drive or system memory), or a combination of both hardware and software elements. It should be noted that FIG. 2 is merely one example of a particular implementation and is merely intended to illustrate the types of components that may be present in the electronic device $101_1$. For example, in the illustrated embodiment, these components may include a storage or memory device 201, one or more processors 202, a communication interface 203 and a display device 204. While not illustrated in FIG. 2, the electronic device $101_1$ may also include expansion card(s), and power source.

The communication interface 203 may allow the device 1011 to receive data as well as provide data. In one embodiment, communication interface 203 may include user input-output devices, display device and audio devices, and wireless communications devices. Using the user input-output devices, the user may supply user inputs to control the operations of the device $101_1$. The user input-output devices include a camera, buttons, a microphone port, a speaker port, etc. In one embodiment, the electronic device $101_1$ may include a housing that includes a display device 204 such as a display screen on the front face of the device $101_1$. The display screen 16 may be a touch screen. In one embodiment, the user may provide a user input that using a user input-output device that indicates a selection on the graphical user interface being displayed on the display screen.

The communication interface 203 may also include wireless communications devices having communications circuitry such as radio frequency (RF) transceiver circuitry, antennas, etc. . . . The communication interface 203 may allow the device $101_1$ to communicate with the network 102. The network 102 may be any one of a variety of different wireless communications networks and in accordance with any one of several different call protocols. These include: a cellular mobile phone network (e.g. a Global System for Mobile communications, GSM, network), including current 2G, 3G and 4G networks; and an IEEE 802.11 network (WiFi or Wireless Local Area Network, WLAN) which may support wireless voice over internet protocol (VOIP). The network 102 may also be a cloud computing network or the Internet.

In FIG. 2, the device 1011 may also include a processor 202, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 202 may be used to control the operations of device $101_1$. For example, the processor 202 may be coupled to the communication interface 203 and signal to the communication interface 203 to transmit user input received via a user input-output device to the server 103 via the network 102. The processor 202 may also be coupled to the display device 204 to cause the display device 204 to display a user interface display received from the server 103. In some cases, a particular function may be implemented as two or more pieces of software that are being executed by different hardware units of a processor.

In one embodiment, the processor 202 is also coupled to the storage device 201. The storage device 201 stores instructions (e.g. software; firmware) which may be executed by the processor 202. The storage device 201 may include one or more different types of storage such as hard disk drive storage, nonvolatile memory, and volatile memory such as dynamic random access memory.

Figure 3:
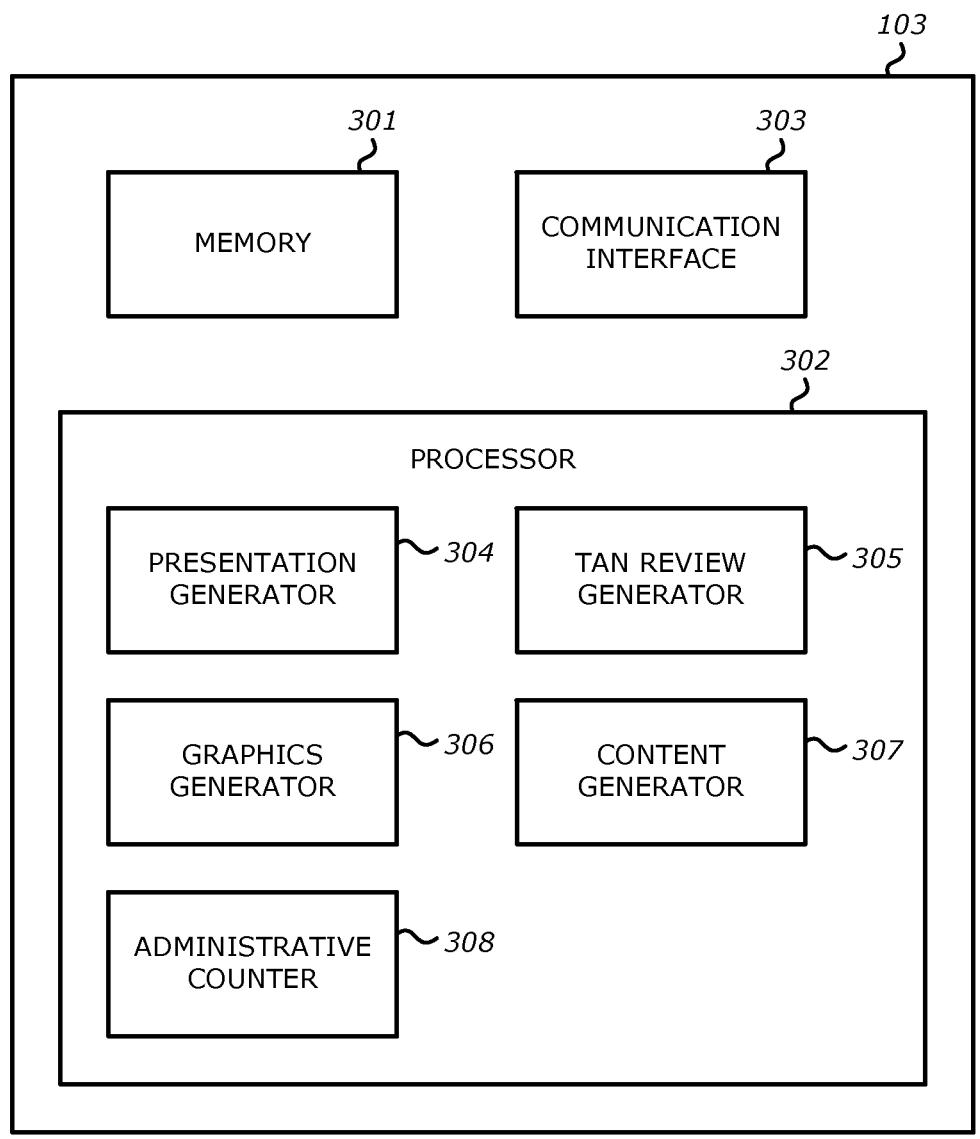
FIG. 3 illustrates a block diagram of the details of a server included in the system in FIG. 1 in accordance to one embodiment of the invention.

FIG. 3 illustrates a block diagram of the details of the server 103 included in the system in FIG. 1 in accordance to one embodiment of the invention and which may allow the server 103 to function in accordance with the techniques discussed herein. The server 103 includes a memory device 301, one or more processors 302, and a communication interface 303. The various functional blocks shown in FIG. 3 may include hardware elements (including circuitry), software elements (including computer code stored on a computer-readable medium, such as a hard drive or system memory), or a combination of both hardware and software elements. It should be noted that FIG. 3 is merely one example of a particular implementation and is merely intended to illustrate the types of components that may be present in the server 103.

The communication interface 303 may allow the server 103 to receive data as well as provide data. In one embodiment, communication interface 303 may include user input-output devices, display device and audio devices, and wireless communications devices. Via the communication interface 303, a user interface display may be transmitted to the device $101_1$ and a user input may be received from the device $101_1$. The communication interface 303 may also include wireless communications devices having communications circuitry such as radio frequency (RF) transceiver circuitry, antennas, etc. . . . The communication interface 303 may allow the device $101_1$ to communicate with the network 102.

In FIG. 3, the server 103 may also include a processor 302, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 302 may be used to control the operations of server 103. For example, the processor 302 may be coupled to the communication interface 303 and signal to the communication interface 303 to receive user input received from the device $101_1$ and to transmit the user interface display to the device $101_1$ via the network 102. In some cases, a particular function may be implemented as two or more pieces of software that are being executed by different hardware units of a processor.

As above in FIG. 3, the memory device 301 may include one or more different types of storage such as hard disk drive storage, nonvolatile memory, and volatile memory such as dynamic random access memory. The processor 302 may also be coupled to the storage device 301. The storage device 301 stores instructions (e.g. software; firmware) which may be executed by the processor 302 to cause the processor 302 to perform a method of generating presentations. As shown in FIG. 3, the processor 302 may also include or be coupled to components that comprise: a presentation generator 304, a team review generator 305, a statistics generator 306, a content generator 307 and an administrative controller 308. Based on the user input received from the device $101_1$, the processor 302 may activate one of these components to generate a user interface display accordingly that is transmitted to the device $101_1$ to be displayed to the user.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
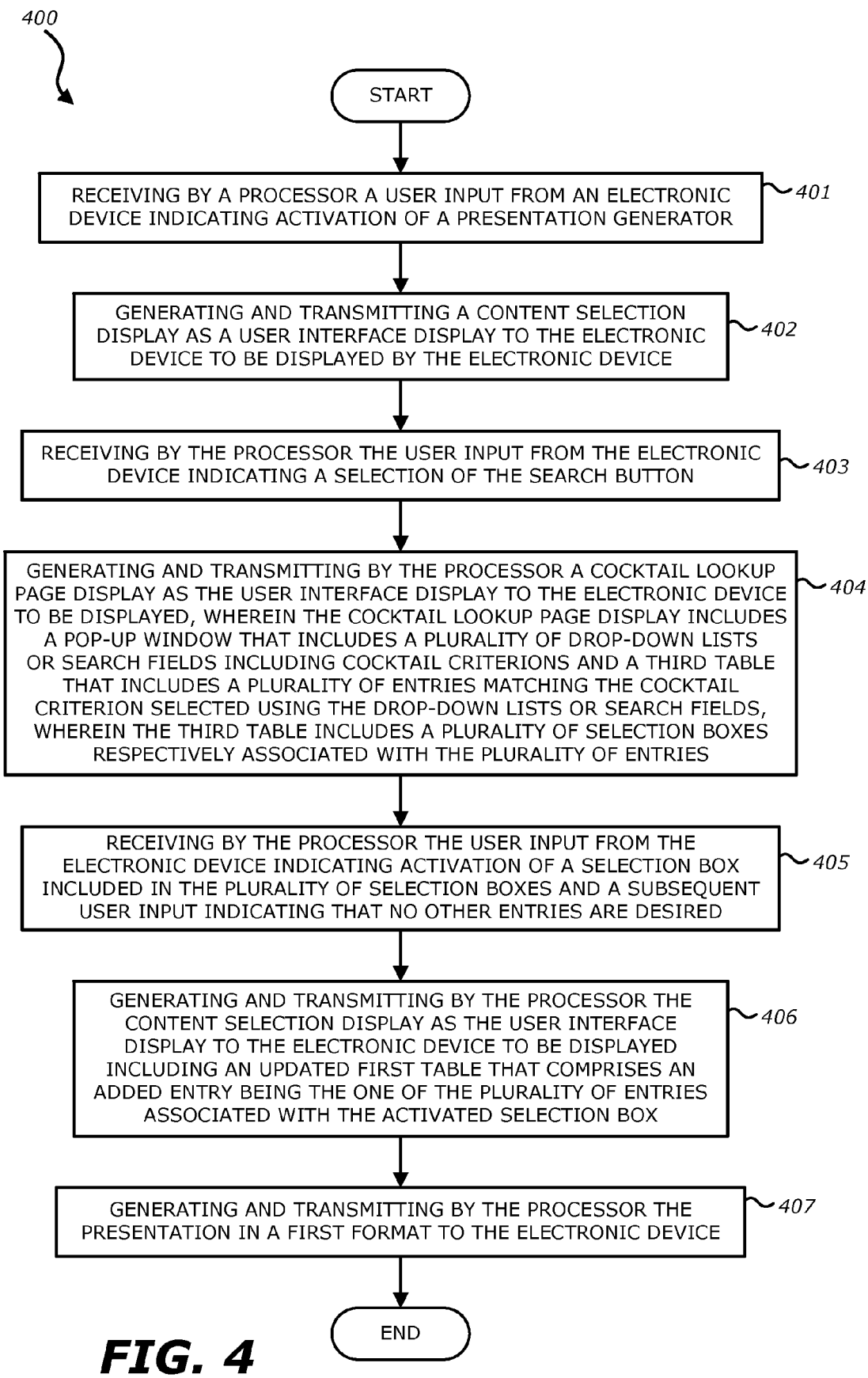
FIG. 4 is a flowchart illustrating a method to generate a presentation in accordance to one embodiment of the invention.
Figure 5C:

FIG. 4 is a flowchart illustrating a method 400 to generate a presentation in accordance to one embodiment of the invention. The method 400 starts at Block 401 with the processor 302 included in the server 103 receiving a user input from an electronic device $101_1$ indicating activation of a presentation generator 304. At Block 402, the processor 302 may generate and transmit a content selection display as a user interface display to the electronic device to be displayed by the electronic device $101_1$. FIGS. 5A-5F are exemplary graphical user interfaces that may be used in the generation of a presentation in accordance to one embodiment of the invention. Referring to FIG. 5A, an exemplary graphical user interface of the content selection display is illustrated. As shown in FIG. 5A, the content selection display may include a search button (e.g., + Lookup button), a first and a second table. The first table may include a list of selected cocktails to be included as a plurality of slides, respectively, in the presentation. In FIG. 5A, an entry in the first table includes the spirit type (e.g., gin), the brand of spirit (e.g., Bombay Sapphire™), the supplier (e.g., Bacardi™), the number of ingredients, the degree of difficulty, the cocktail style (e.g., mixology), the cocktail glass style (e.g., old fashioned), theme or seasonal type (e.g., Hallow-een), outlet type (e.g., lobby, restaurant, pool). The first table may also include an action column that includes selectable graphical items that correspond to each entry. The user may select this graphical item to delete the entry from the first table for example. The second table may include a type of spirit associated with a spirit number count. In one embodiment, the processor 302 causes a counter to automatically generate the spirit number count by counting a number of cocktails in the first table that includes the type of spirit.

Referring back to FIG. 4, at Block 403, the processor 302 may receive the user input from the electronic device indicating a selection of the search button. For example, the user that is viewing the content selection display being displayed on his electronic device 1011 may select the search button (e.g., + Lookup button) using a mouse input device to click on the search button. This selection processed and transmitted by the processor 302 in the electronic device $101_1$ to the server 103 via the communication interfaces 203, 303. At Block 404, the processor 302 generates and transmits to the electronic device $101_1$ a cocktail lookup page display as the user interface display to be displayed by the electronic device $101_1$. Referring to FIG. 5B, an exemplary graphical user interface of the cocktail lookup page display is illustrated. As shown in FIG. 5B, the cocktail lookup page display may include a pop-up window that includes a plurality of drop-down lists including cocktail criterions such as a type of spirit, a brand of spirit, a number of ingredients, a degree of difficulty, a cocktail style, a cocktail glass style, a theme, and an outlet type. The cocktail lookup page display may also include a third table that includes a plurality of entries matching the cocktail criterion selected using the drop-down lists. In another embodiment, in lieu of the drop-down lists that include the cocktail criterions, the cocktail lookup page display may include search fields to receive text input from the user. Accordingly, the user may directly type text into the search fields (or smart search field) to input the desired cocktail criterion. The search field may also be a smart search field that autocompletes the user's text entry based on available cocktail criterions. The third table may also include an "add" column that includes a plurality of selection boxes respectively associated with the plurality of entries. For instance, the selection boxes may be a selectable radio button used to select which entries are to be added to the first table in the content selection display in FIG. 5A. At Block 405, the processor 302 receives the user input from the electronic device indicating activation of a selection box included in the plurality of selection boxes and a subsequent user input indicating that no other entries are desired. For instance, in FIG. 5B, the user may have added the first and third entries in the table by activating the radio buttons in the "add" column. To indicate that no other entries are desired, the user may have clicked on the close button in FIG. 5B. At Block 406, the processor 302 generates and transmits to the electronic device the content selection display as the user interface display to be displayed on the electronic device. At Block 406, the content selection display that is generated and transmitted includes an updated first table that comprises an added entry being the one of the plurality of entries associated with the activated selection box. For example, the first table in FIG. 5A may be updated to include new rows with the information from the selected entries from the third table in the cocktail lookup page display in FIG. 5B. At Block 407, the processor 302 may generate and transmit a presentation in a first format to the electronic device $101_1$. The presentation may include slides corresponding to the entries in the first table.

Figure 5E:
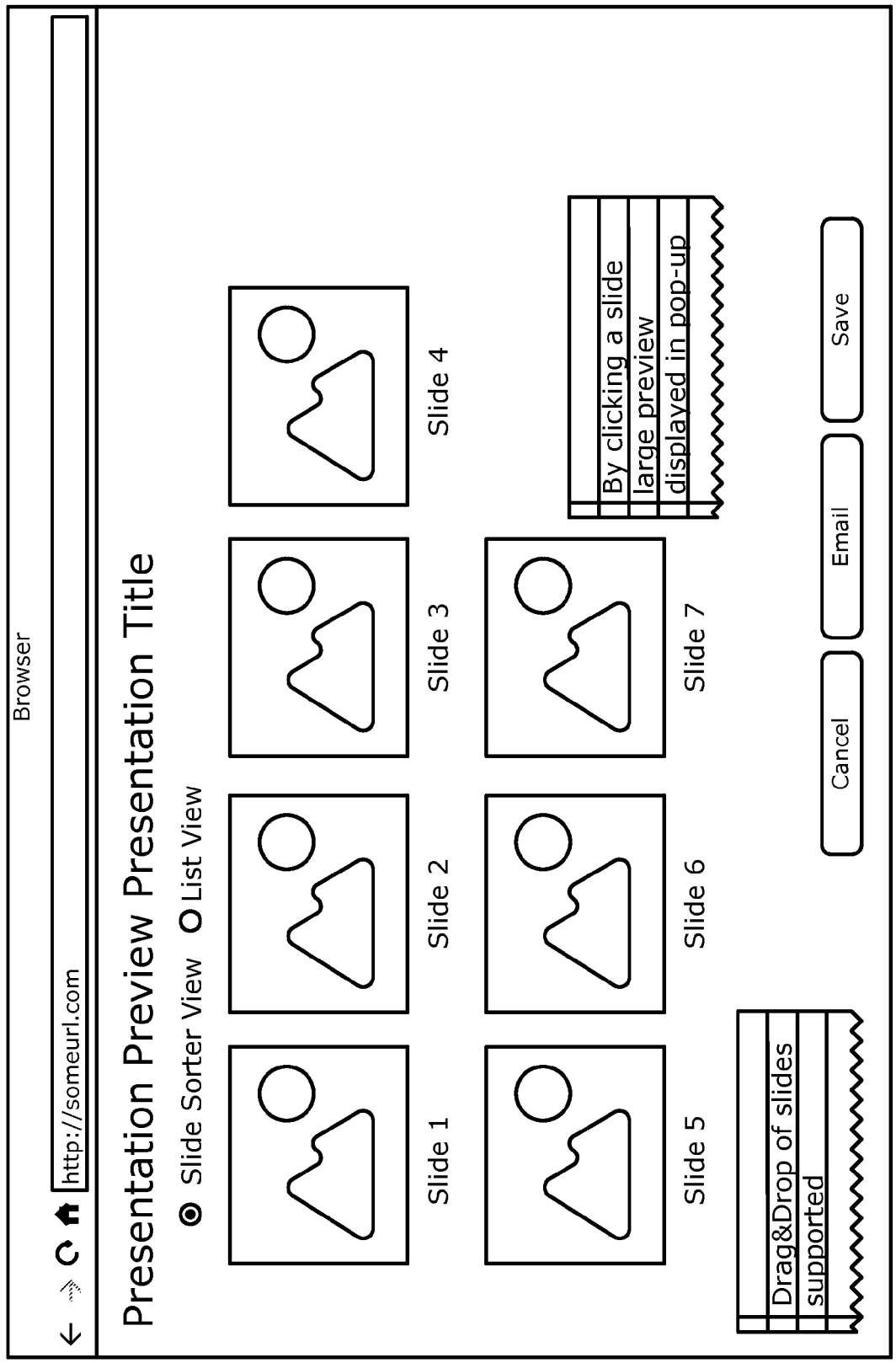
Figure 5F:
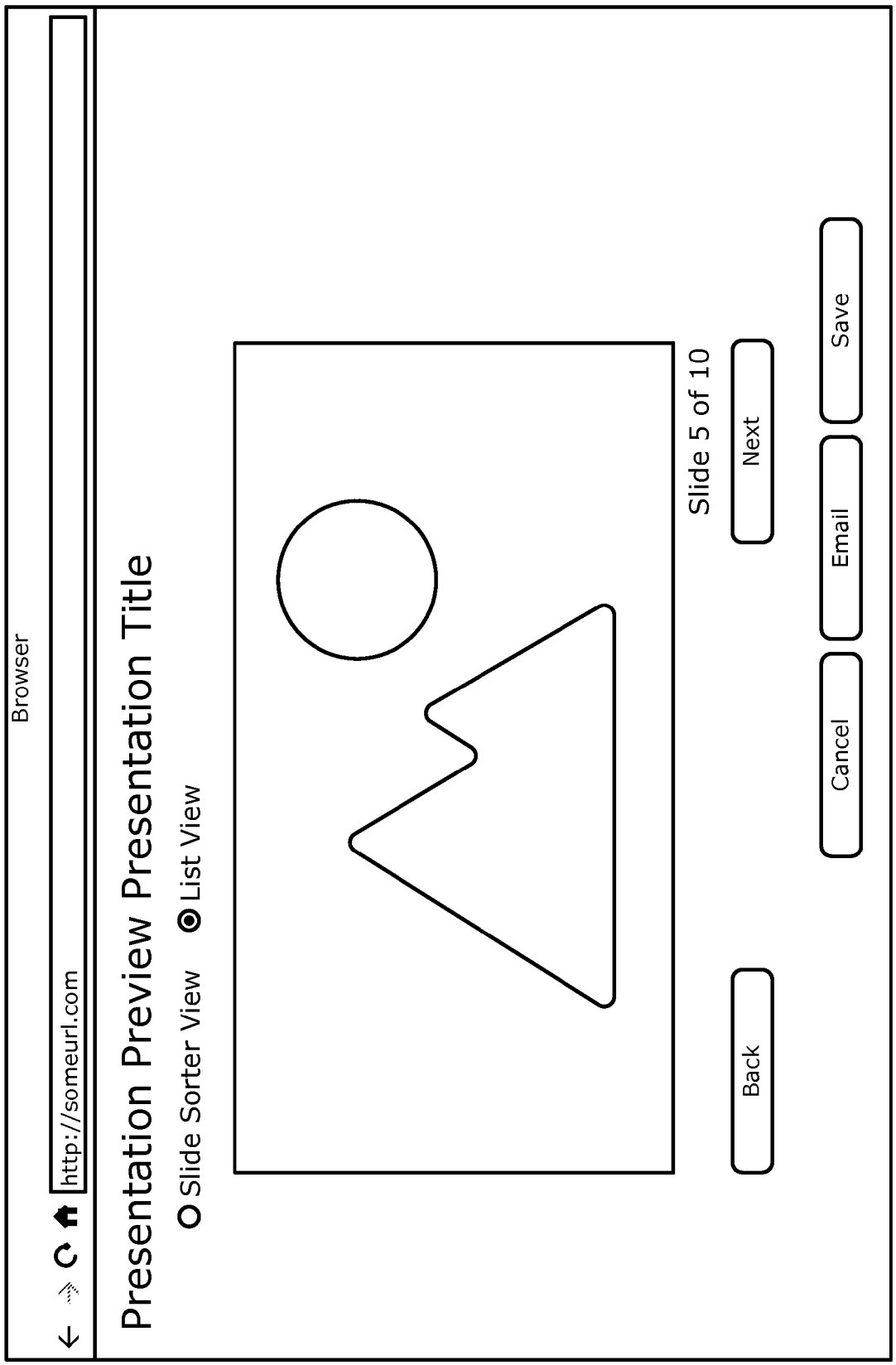

Referring back to FIG. 5A, the content selection display may further includes a create presentation button. When the user input indicates an activation of the create presentation button, the processor 302 receives this user input and generates and transmits a creation page display as the user interface display to the electronic device 101₁. In FIG. 5C, an exemplary graphical user interface of the presentation creation page display in accordance to one embodiment of the invention is illustrated. The presentation creation page display as shown in FIG. 5C may include a preview of a front page of a presentation, a viewing button, a sending button, and a saving button. The viewing, sending and saving buttons may be selectable graphical buttons. When the processor 302 receives the user input from the electronic device indicating activation of a selectable button to save the current presentation (e.g., clicking on the saving button), the processor 302 may generate and transmit a presentation list page display as the user interface display. In FIG. 5D, an exemplary graphical user interface of the presentation list page display in accordance to one embodiment of the invention is illustrated. The presentation list page may include a table having entries for each presentation saved by the user, a selectable button to generate the presentation in a first format (e.g., PPT button) and a selectable button to generate the presentation in a second format (e.g., PDF button). When the user input indicates the activation of the selectable button to generate the presentation in the first format (e.g., the user clicks on the PPT button), the processor 302 generates and transmits the presentation in the first format and transmits the presentation in the first format to the electronic device 101₁. Referring back to FIG. 5C, when the user input indicates the activation of the selectable button to view the presentation (e.g., clicking on the viewing button), the processor 302 generates and transmits a preview presentation display as the user interface display to the electronic device. In FIGS. 5E-5F, exemplary graphical user interfaces of the preview presentation display in accordance to embodiments of the invention are illustrated. As shown in FIG. 5E, the preview presentation display includes selection buttons for a slide sorter view and a list view, respectively. The selection buttons may be selectable graphic buttons. When the slide sorter view is selected, the processor 302 receives the user input indicating activation of the slide sorter view selection button, and generates and transmits the preview presentation display that further includes a gallery of the plurality of slides as shown in FIG. 5E. When the user input is received by the processor 302 that indicates a selection of one of the slides in the gallery in FIG. 5E, the selected slide may be displayed in a pop-up. In one embodiment, when the user input is received that indicates dragging and dropping the selected slide in the gallery, the gallery of the plurality of slides is updated based on the user input. Accordingly, the user may reorder the slides in the presentation using this drag-and-drop feature. When the list view is selected in the preview presentation display, the processor 302 generates and transmits the user preview presentation display in FIG. 5F. In one embodiment, the user preview presentation display in the list view includes one slide being displayed and button to display previous (e.g., previous button) and next slides (e.g., next button) when the buttons activated (e.g., clicking on the buttons).

FIG. 6 is an exemplary graphical user interface that may be used in the generation of a team review document in accordance to one embodiment of the invention. In one embodiment, a user such as a manager using the system 1 may click on a link or icon being displayed on the user interface to activate a team review generator 305 in order to generate a team review document. When the processor 302 receives a user input indicates an activation of a team review generator, the processor 302 may generate and transmit a team review display as the user interface display to the electronic device 101₁. The team review display in FIG. 6 includes input boxes to display a time frame inputted by the user, and a fourth table including a plurality of identifiers for users of the system (e.g., the user's names), a corresponding number of presentations generated within the time frame by the users of the system (e.g., first column "In Frame"), a corresponding number of presentations generated within the length of a year by the users of the system (e.g., second column "In Frame LY"), and within a month by the users of the system (e.g., third column "Current Month"). The user may use this team review page to review productivity of sales representatives in a given sales group. The page may include a tree with hierarchy of users in managed groups. In one embodiment, the rows in the fourth table may be sorted using the key indicators. The processor 302 may also generate a document that includes the entire fourth table in a format such as Excel. The user on his electronic device 101₁ may download this document including the fourth document.

Figure 7:
FIG. 7 is an exemplary graphical user interface that may be used in the generation of a cocktail statistics document in accordance to one embodiment of the invention.

FIG. 7 is an exemplary graphical user interface that may be used in the generation of a cocktail statistics document in accordance to one embodiment of the invention. In one embodiment, a user such as a manager using the system 1 may click on a link or icon being displayed on the user interface to activate a statistics generator 306 in order to generate a cocktails statistics document. When the processor 302 receives a user input indicates an activation of the cocktail statistics generator, the processor 302 generates and transmits the cocktail statistics display as the user interface display to the electronic device. As shown in FIG. 7, the cocktail statistics display includes input boxes to display a time frame inputted by the user, and a fifth table including a plurality of identifiers for a type of cocktail (e.g., name of the cocktail "tequila sunrise"), a corresponding number of presentations generated within the time frame including the type of cocktail (e.g., first column "In Frame"), a corresponding number of presentations generated within the length of a year including the type of cocktail (e.g., second column "In Frame LY"), and within a month including the type of cocktail (e.g., third column "Current Month"). On this cocktail statistics page, a user can view which cocktails are popular and how many presentations were created using each cocktail in a given sales group. The cocktail statistics page may also include a tree with hierarchy of sales group. The fifth table may have search and pagination functionality. In one embodiment, the rows in the fifth table may be sorted using the key indicators. The processor 302 may also generate a document that includes the entire fifth table in a format such as Excel. The user on his electronic device 101₁ may download this document including the fifth table.

FIG. 8 is an exemplary graphical user interface that may be used in the generation of a cocktail recipe to be stored in the database for presentation generation in accordance to one embodiment of the invention. In one embodiment, a user such as a mixologist using the system 1 may click on a link or icon being displayed on the user interface to generate a cocktail recipe to be stored in the database. The database may be included in the storage device 301. Users when generating a presentation document may access the cocktail recipes included in the database. For instance, the cocktails recipes included in the database may be found in the cocktail lookup page display of FIG. 5B. When the processor 302 receives a user input that indicates an activation of the content generator 307, the processor 302 activates the content generator to add a cocktail recipe to a database in the storage device. The processor 302 may generate and transmit the user interface display in FIG. 8 which includes a plurality of drop-down lists and text input boxes for selecting or inputting, for example, the type of spirit, a brand of spirit, a number of ingredients, a degree of difficulty, a cocktail style, a cocktail glass style, a theme, and an outlet type. The content generator display as shown in FIG. 8 may also include a fifth table that includes entries for ingredients and corresponding quantities of the ingredients in the cocktail recipe.

Figure 9A:
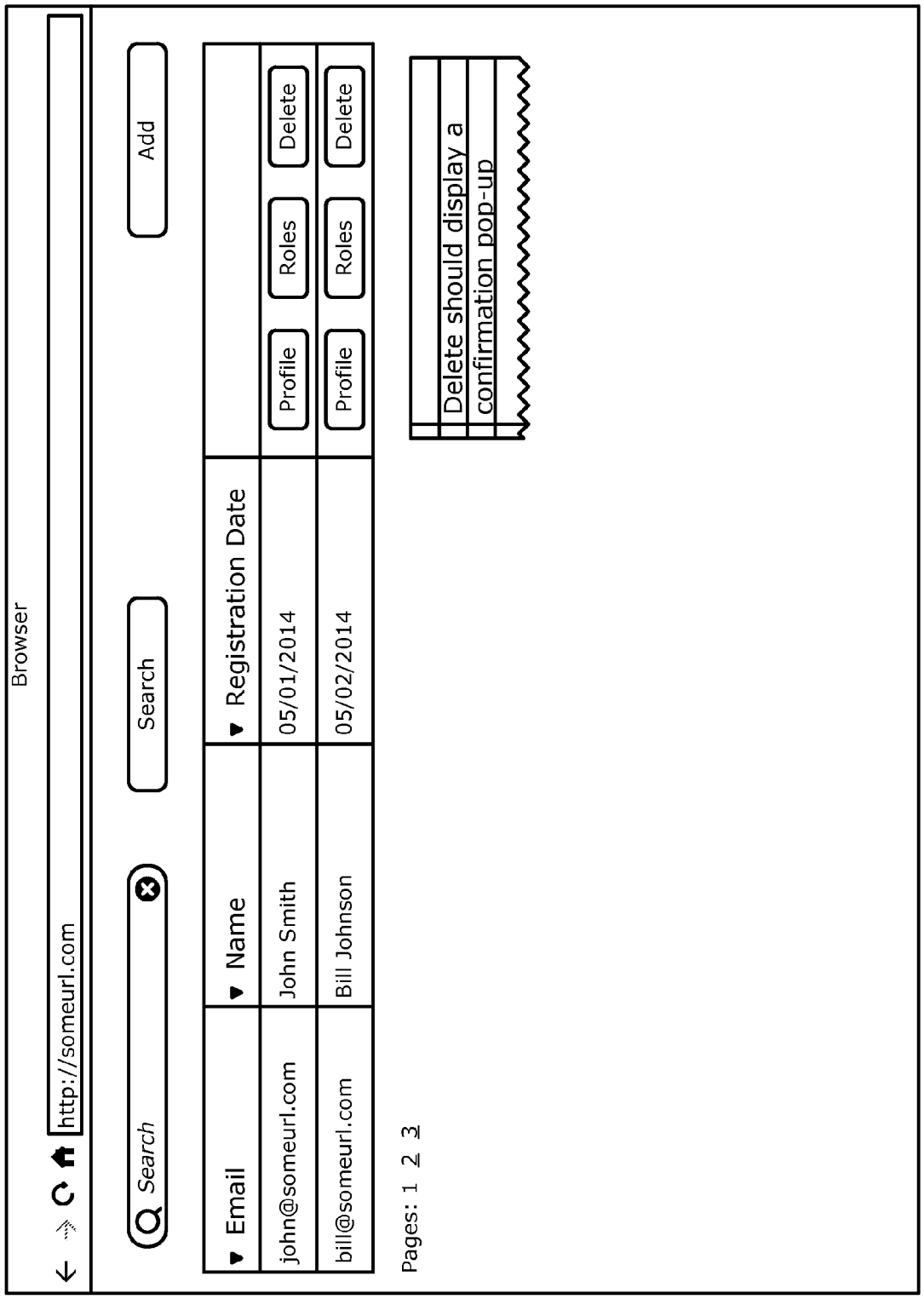
Figure 9B:
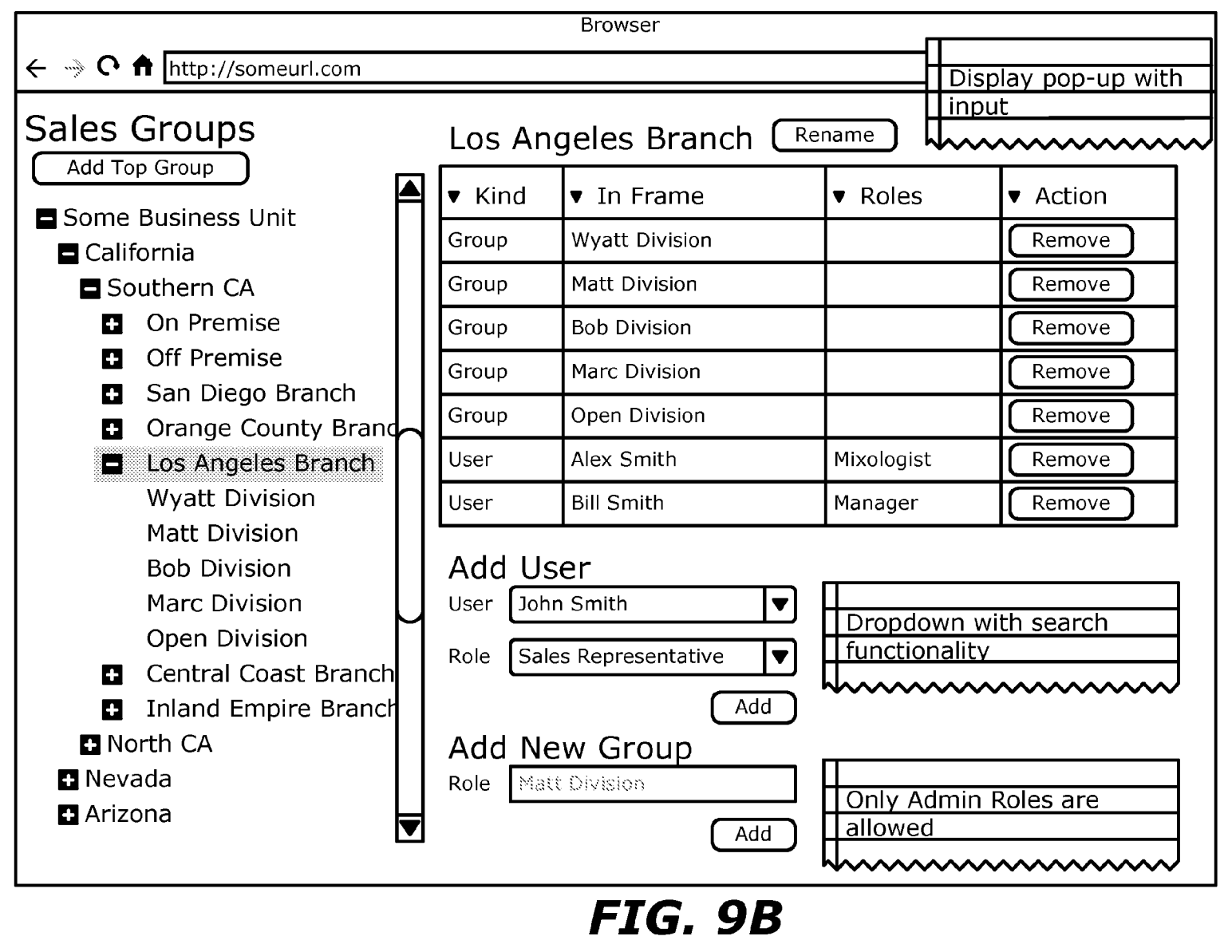

FIGS. 9A-9D are exemplary graphical user interfaces that may be used for the administration of the system in FIG. 1 in accordance to one embodiment of the invention. The processor 302 may receive credentials from a user that verifies that the user is an administrator. Once the user is verified, the processor 302 may generate and transmit a user interface display as shown in FIGS. 9A-9D to the user that is an administrator. As discussed above, the user that is an administrator may use the system 1 to perform administrative tasks such as searching, adding, deleting, or editing the patterns for user emails, the users of the system 1 (see FIG. 9A for example), the groups of users of the system 1 (see FIG. 9B for example), the cocktail lists included in the system 1 (see FIG. 9C for example), the settings for notifications (see FIG. 9D for example), the clients of the system 1 (e.g., cocktail distributors), the advertisements displayed by the system 1, etc. Referring to FIG. 9A, the administrator may use this user interface display edit the user's profile, the roles associated with the users, delete the user from the system, etc. Referring to FIG. 9B, the administrator may search, add, or delete groups or users in the groups. Referring to FIG. 9C, the administrator may search the cocktail recipes from all mixologists using the search functionality (e.g., the search input box). In some embodiments, the search may be performed either by cocktail name or by cocktail supplier. The administrator may also view cocktail details, edit the details, or delete the cocktail recipe entry. The administrator may also edit the access rights associated with each cocktail recipe entry. Referring to FIG. 9D, the administrator may also be provided with a user interface that may be used to send messages to various groups and users of the system 1.

While the embodiments above pertain to cocktails, one embodiment of the invention also includes wines. For example, in FIG. 5A, the first table may also include a list of selected wines to be included as a plurality of slides. The entry in the first table in this embodiment may include the wine type (e.g., Merlot), the brand, the supplier, the type of glass, etc.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components. In one embodiment, the machine-readable medium includes instructions stored thereon, which when executed by a processor, causes the processor to perform the method of generating a presentation document as described above.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system to generate a presentation document comprising:
   an electronic device including a display device to display a user interface display, an input device to receive a user input, and a device processor to transmit the user input to a network;
   a server coupled to the electronic device via the network, the server including a storage device and a processor, the processor to:
   generate and transmit the user interface display to the electronic device,
   wherein, when the user input indicates activation of a presentation generator,
      the user interface display is a content selection display that includes a search button, a first table including a list of selected cocktails to be included as a plurality of slides, respectively, in the presentation, and a second table including a type of spirit associated with a spirit number count, wherein the processor causes a counter to automatically generate the spirit number count by counting a number of cocktails in the first table that includes the type of spirit,
   wherein, when the user input indicates a selection of the search button,
      the user interface display is a cocktail lookup page display that includes a pop-up window that includes a plurality of drop-down lists or search fields including cocktail criterions and a third table that includes a plurality of entries matching the cocktail criterion selected using the drop-down lists or search fields, wherein the third table includes a plurality of selection boxes respectively associated with the plurality of entries,
   wherein, when the user input indicates an activation of a selection box included in the plurality of selection boxes and a subsequent user input indicates that no other entries are desired, the one of the plurality of entries associated with the activated selection box is added to the first table, and the user interface display is the content selection display that includes an updated first table.

2. The system of claim 1, wherein the plurality of drop-down lists or search fields includes at least one of the type of spirit, a brand of spirit, a number of ingredients, a degree of difficulty, a cocktail style, a cocktail glass style, a theme, and an outlet type.

3. The system of claim 2, wherein each category of the plurality of drop down lists or search fields is included in the third table.

4. The system of claim 1, wherein the content selection display further includes a create presentation button, and when the user input indicates an activation of the create presentation button, the user interface display is a creation page display including a preview of a front page of a presentation, a viewing button, a sending button, and a saving button.

5. The system of claim 4, wherein when the user input indicates an activation viewing button, the user interface display is a preview presentation display that includes selection buttons for a slide sorter view and a list view, respectively.

6. The system of claim 5, wherein when the user input indicates the activation of the slide sorter view selection button, the preview presentation display further includes a gallery of the plurality of slides, wherein when the user input is received that indicates a selection of one of the slides, the selected slide is displayed in a pop-up.

7. The system of claim 6, wherein when the user input is received that indicates dragging and dropping the selected slide, the gallery of the plurality of slides is updated based on the user input.

8. The system of claim 4, wherein when the user input indicates the activation of the list view selection button, the user preview presentation display further includes one slide and buttons to display previous and next slides when the buttons activated.

9. The system of claim 4, wherein when the user input indicates the activation of the saving button, the user interface display is a presentation list page that includes a table having entries for each presentation saved, a selectable button to generate the presentation in a first format and a selectable button to generate the presentation in a second format.

10. The system of claim 9, wherein when the user input indicates the activation of the selectable button to generate the presentation in the first format, the processor generates the presentation in the first format and transmits the presentation in the first format to the electronic device.

11. The system of claim 1, wherein when the user input indicates an activation of a team review generator, the user interface display is a team review display that includes input boxes to display a time frame inputted by the user, and a fourth table including a plurality of identifiers for users of the system, a corresponding number of presentations generated within the time frame by the users of the system, a corresponding number of presentations generated within a year by the users of the system, and within a month by the users of the system.

12. The system of claim 1, wherein when the user input indicates an activation of a cocktail statistics generator, the user interface display is a cocktail statistics display that includes input boxes to display a time frame inputted by the user, and a fifth table including a plurality of identifiers for a type of cocktail, a corresponding number of presentations generated within the time frame including the type of cocktail, a corresponding number of presentations generated within a year including the type of cocktail, and within a month including the type of cocktail.

13. The system of claim 1, wherein when the user input indicates an activation of a content generator to add a cocktail recipe to a database in the storage device, the user interface display includes a plurality of drop-down lists and text input boxes for selecting or inputting at least one of the type of spirit, a brand of spirit, a number of ingredients, a degree of difficulty, a cocktail style, a cocktail glass style, a theme, and an outlet type, wherein the content generator display includes a fifth table that includes entries for ingredients and corresponding quantities of the ingredients in the cocktail recipe.

14. A method of generating a presentation comprising:
receiving by a processor a user input from an electronic device indicating activation of a presentation generator;
generating and transmitting by the processor a content selection display as a user interface display to the electronic device to be displayed, wherein the content selection display includes a search button, a first table including a list of selected cocktails to be included as a plurality of slides, respectively, in the presentation, and a second table including a type of spirit associated with a spirit number count, wherein the processor causes a counter to automatically generate the spirit number count by counting a number of cocktails in the first table that includes the type of spirit;
receiving by the processor the user input from the electronic device indicating a selection of the search button;
generating and transmitting by the processor a cocktail lookup page display as the user interface display to the electronic device to be displayed, wherein the cocktail lookup page display includes a pop-up window that includes a plurality of drop-down lists or search fields including cocktail criterions and a third table that includes a plurality of entries matching the cocktail criterion selected using the drop-down lists or search fields, wherein the third table includes a plurality of selection boxes respectively associated with the plurality of entries;
receiving by the processor the user input from the electronic device indicating activation of a selection box included in the plurality of selection boxes and a subsequent user input indicating that no other entries are desired;
generating and transmitting by the processor the content selection display as the user interface display to the electronic device to be displayed including an updated first table that comprises an added entry being the one of the plurality of entries associated with the activated selection box; and
generating and transmitting by the processor the presentation in a first format to the electronic device.

15. The method of claim 14, further comprising:
receiving by the processor the user input from the electronic device indicating
activation of a selectable button to generate the presentation in the first format.

16. The method of claim 14, wherein the plurality of drop-down lists or search fields includes at least one of the type of spirit, a brand of spirit, a number of ingredients, a degree of difficulty, a cocktail style, a cocktail glass style, a theme, and an outlet type.

17. The method of claim 14, further comprising:
receiving by the processor the user input indicating activation of a create presentation button, wherein the content selection display further includes a create presentation button; and
generating and transmitting by the processor a creation page display as the user interface display that includes a preview of a front page of a presentation, a viewing button, a sending button, and a saving button.

18. The method of claim 17, further comprising:
receiving by the processor the user input indicating activation of the viewing button, and
generating and transmitting by the processor a preview presentation display as the user interface display that includes selection buttons for a slide sorter view and a list view, respectively.

19. The method of claim 18, further comprising:
receiving by the processor the user input indicating activation of the slide sorter view selection button, and
generating and transmitting the preview presentation display that further includes a gallery of the plurality of slides.

20. A non-transitory computer-readable storage medium having stored thereon instructions, when executed by a processor, causes the processor to perform a method of generating a presentation comprising:
receiving a user input from an electronic device indicating activation of a presentation generator;
generating and transmitting a content selection display as a user interface display to the electronic device to be displayed, wherein the content selection display includes a search button, a first table including a list of selected cocktails to be included as a plurality of slides, respectively, in the presentation, and a second table including a type of spirit associated with a spirit number count, wherein the processor causes a counter to automatically generate the spirit number count by counting a number of cocktails in the first table that includes the type of spirit;
receiving by the processor the user input from the electronic device indicating a selection of the search button;
generating and transmitting a cocktail lookup page display as the user interface display to the electronic device to be displayed, wherein the cocktail lookup page display includes a pop-up window that includes a plurality of drop-down lists or search fields including cocktail criterions and a third table that includes a plurality of entries matching the cocktail criterion selected using the drop-down lists or search fields, wherein the third table includes a plurality of selection boxes respectively associated with the plurality of entries;
receiving the user input from the electronic device indicating activation of a selection box included in the plurality of selection boxes and a subsequent user input indicating that no other entries are desired;
generating and transmitting the content selection display as the user interface display to the electronic device to be displayed including an updated first table that comprises an added entry being the one of the plurality of entries associated with the activated selection box; and
generating and transmitting the presentation in a first format to the electronic device.

* * * * *